United States Patent [19]

Suppanen

[11] 4,073,635
[45] Feb. 14, 1978

[54] PROCESS FOR PRODUCING A SLURRY SUITABLE FOR THE MANUFACTURE OF A MIXED FERTILIZER CONTAINING NITROGEN PLUS PHOSPHORUS

[75] Inventor: Pekka Ilkka Juhani Suppanen, Ruomela, Finland

[73] Assignee: Kemira Oy, Finland

[21] Appl. No.: 686,536

[22] Filed: May 14, 1976

[51] Int. Cl.² .............................................. C05B 13/02
[52] U.S. Cl. .......................................... 71/34; 71/37; 71/39; 71/40; 71/41; 71/43; 423/310; 423/321 R
[58] Field of Search ................... 71/32, 33, 34, 37, 39, 71/40, 41, 43; 423/309, 310, 319, 313, 321

[56] References Cited

U.S. PATENT DOCUMENTS

| 3,026,192 | 3/1962 | Tapin | 71/43 |
| 3,249,421 | 5/1966 | Bigot et al. | 71/43 X |
| 3,416,910 | 12/1968 | Legal, Jr. | 71/37 X |

Primary Examiner—Thomas G. Wyse
Assistant Examiner—Ferris H. Lander
Attorney, Agent, or Firm—Bucknam and Archer

[57] ABSTRACT

Crude phosphate is leached with nitric acid to produce an acid slurry, which is thereafter neutralized with ammonia in two successive stages while simultaneously cooling it and adding acid, part of the crude phosphate phosphorus being replaced with phosphoric acid added to the slurry to be neutralized, and in such a manner that at maximum 40% of the phosphoric acid is fed to the first neutralization stage and the rest is fed to the second neutralization stage, whereby the acidity of the slurry is adjusted to pH 2.5 – 4.5 during the first and to pH 5.0 – 6.0 during the second neutralization stage.

10 Claims, 1 Drawing Figure

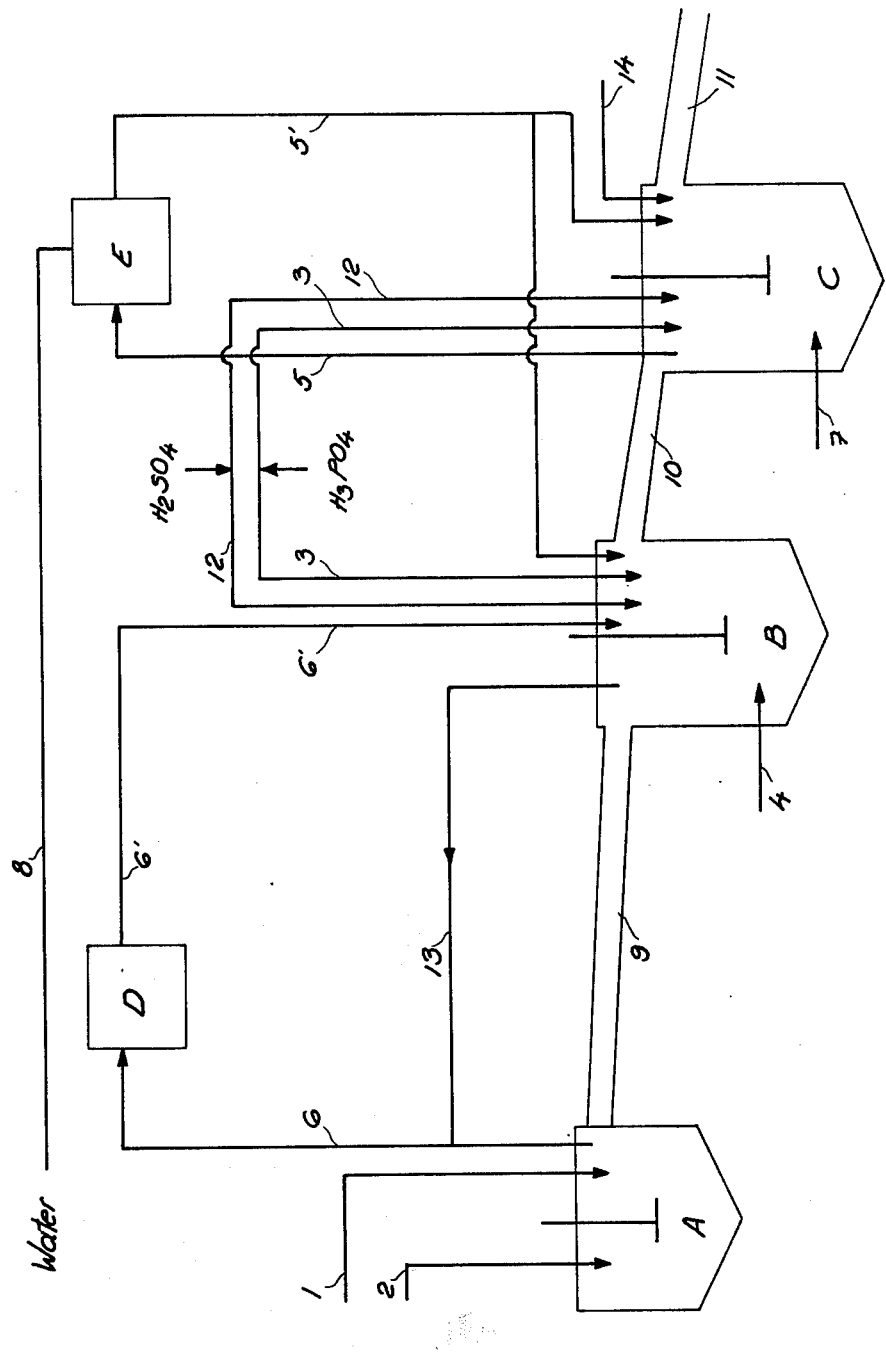

PROCESS FOR PRODUCING A SLURRY SUITABLE FOR THE MANUFACTURE OF A MIXED FERTILIZER CONTAINING NITROGEN PLUS PHOSPHORUS

BACKGROUND OF THE INVENTION

The present invention relates to a process for producing a slurry suitable for the manufacture of a mixed fertilizer containing nitrogen plus phosphorus and possibly potassium.

The source of phosphorus commonly used in the manufacture of mixed fertilizers containing nitrogen, phosphorus, and potassium, i.e., so-called NPK fertilizers, is a crude phosphate, e.g., apatite. The aim is to convert the phosphorus present in apatite to such a form that it is available to plants. This occurs when nitric acid is caused to react with crude phosphate, whereby phosphorus is released as phosphoric acid. In the successive stages the produced acid mixture and the fed additional acids, phosphoric acid and possibly sulfuric acid, are neutralized to the desired degree by means of ammonia.

Apatite contains per one $P_2O_5$ molecule an average of 3.35 CaO molecules, of which 3 are combined with $P_2O_5$ and 0.35 with fluorine and other negative anions. Such a compound forms an apatite molecule, in which the $P_2O_5$ is not available to plants. In the process the apatite molecule is dissociated by means of nitric acid, and thereby the $P_2O_5$ is obtained in a soluble or ionizable form.

A slight excess of nitric acid is used in the reactions between apatite and nitric acid, and thereby a short reaction period and a high efficiency are achieved. With apatite, 6.8 mol nitric acid is used per one apatite molecule.

On ammonization of the mixture, ammonium nitrate is thus obtained, the $P_2O_5$ changes into dicalcium phosphate ($P_2O_5$, 2 CaO) through monocalcium phosphate ($P_2O_5$, CaO), and part of the calcium remains in calcium nitrate $Ca(NO_3)_2$.

Reaction between apatite and nitric acid:

$$P_2O_5 \cdot 3.35\ CaO + 6.8\ HNO_3 \rightarrow P_2O_5 + 3.35\ Ca(NO_3)_2 + 0.1\ HNO_3$$

Neutralization reaction:

$$P_2O_5 + 3.35\ Ca(NO_3)_2 + 0.1\ HNO_3 + 4.1\ NH_3 \rightarrow P_2O_5 \cdot 2CaO + 1.35\ Ca(NO_3)_2 + 4.1\ NH_4NO_3$$

The calcium nitrate, $Ca(NO_3)_2$, must be removed since in a fertilizer it would cause insurmountable difficulties owing to its highly hygroscopic nature.

In the Odda process (Farm Chemicals, May 1967, p. 29) part of the calcium derived from the leaching of crude phosphate is removed by crystallizing it as calcium nitrate tetrahydrate. This process has, however, drawbacks, i.e., the expensive crystallization and the great number of byproducts which are difficult to market.

In another process, the PEC process (Farm Chemicals, May 1967, p. 28), calcium is precipitated by means of some acid, e.g., phosphoric acid, in numerous ammonization tanks. A drawback of this process is the great number of ammonization tanks needed for raising the pH of the nitrophosphate slurry by degrees to a value suitable for the manufacture of mixed fertilizers.

Also known are different processes in which phosphoric acid is added together with nitric acid to the crude phosphate leaching stage, whereby phosphoric acid is used instead of part of the phosphorus in the crude phosphate. When nitric acid reacts with crude phosphate, phosphoric acid and calcium nitrate, among other things, are formed which, together with the phosphoric acid added, are thereafter neutralized with ammonia. These processes usually comprise several neutralization stages, or part of the neutralization is performed in a granulator, for the slurry greatly tends to thicken.

SUMMARY OF THE INVENTION

Now, surprisingly, it has been found that the above drawbacks can be eliminated and the number of neutralization stages simultaneously reduced to two by feeding at least approx. 60% of the phosphoric acid to the second neutralization stage, at which the pH is already so high (5.6–6.0) that the slurry cannot thicken. In addition, a good stability is obtained in the reactors.

By the process according to the present invention the phosphorus present in a crude phosphate, e.g., apatite, can be converted to a form available to plants. This is achieved by reactions between nitric acid and apatite, whereby the phosphorus in the apatite is released as phosphoric acid. Part of the phosphorus can also be added directly as phosphoric acid in a manner known per se. It has now been realized that the thickening of the slurry caused by the amount of phosphorus entering the neutralization can be eliminated by replacing part of the crude phosphate by phosphoric acid, at least approx. 60% of which is not fed until the second neutralization stage, where the pH is already so high that the slurry no longer thickens.

The pH of the first neutralization stage is adjusted to 2.5–4.5 and that of the second neutralization stage to 5.0–6.0. The slurry is cooled during the neutralization, preferably to the temperature range 110°–130° C.

In order to obtain water-soluble phosphorus, phosphoric acid and possibly sulfuric acid are added in excess to the neutralization stages, and the advantageous concentration of the phosphoric acid is approx. 30–50% by weight $P_2O_5$.

During the ammonization, phosphoric acid and possibly sulfuric acid are thus added, whereby calcium phosphate or gypsum is produced at the expense of calcium nitrate.

The total reactions can be expressed as follows:

$$P_2O_5 \cdot 3.35\ CaO + 6.8\ HNO_3 + 6.8\ NH_3 + 1.35\ H_3PO_4 \rightarrow 1.675\ (P_2O_5 \cdot 2CaO) + 6.8\ NH_4NO_3$$

$$P_2O_5 \cdot 3.35\ CaO + 6.8\ HNO_3 + 6.8\ NH_3 + 1.35\ H_2SO_4 \rightarrow P_2O_5 \cdot 2CaO + 1.35\ CaSO_4 + 6.8\ NH_4NO_3$$

The phosphorus obtained in this manner is not soluble in water but in ammonium citrate, in which case it is already available to plants. To obtain water soluble phosphorus, the phosphorus should be in the fertilizer in the form of ammonium phosphate. This is achieved by using phosphoric acid and sulfuric acid in excess. The ammonization of phosphorus is usually performed to a point between mono- and diammonium phosphate.

When $H_3PO_4$ with a concentration of 30–50% $P_2O_5$ is used in excess $$P_2O_5 \cdot 3.35\ CaO + 6.8\ HNO_3 + 11.825\ NH_3 + 4.7\ H_3PO_4 \rightarrow 1.675\ (P_2O_5 \cdot 2CaO) + 1.675\ (P_2O_5 \cdot 3NH_3) + 6.8\ NH_4NO_3$$

is obtained.

When $H_2SO_4$ is used in excess $$P_2O_5 \cdot 3.35\ CaO + 6.8\ HNO_3 + 8.3\ NH_3 + 2.35\ H_2SO_4 \rightarrow 0.5\ (P_2O_5 \cdot 2CaO) + 0.5\ (P_2O_5 \cdot 3NH_3) + 2.35\ CaSO_4 + 6.8\ NH_4NO_3$$

is obtained.

When apatite is treated with nitric acid, the fluorine present in the apatite is released in the form of hydrofluoride HF. On ammonization the part which has remained in solution is converted to calcium fluoride and remains in the fertilizer.

$$CaF_2 + 2HNO_3 \rightarrow Ca(NO_3)_2 + 2HF\ Ca(NO_3)_2 + 2HF + 2NH_3 \rightarrow CaF_2 + 2NH_4NO_3$$

The invention is described below in more detail with reference to the enclosed drawing which diagrammatically depicts the apparatus intended for the application of the process according to the invention.

DESCRIPTION OF THE DRAWINGS

In the FIGURE, A indicates the leaching reactor, B the first neutralization reactor, C the second neutralization reactor, and D and E the washers.

DESCRIPTION OF THE PREFERRED EMBODIMENTS

Crude phosphate is fed into the leaching reactor A, provided with a mixer, through the pipe 1 and nitric acid through the pipe 2. When the nitric acid reacts with the crude phosphate, an acid phosphoric-acid-bearing slurry is produced, the temperature of which is adjusted to approx. 60°–80° C, preferably 70° C. From the leaching reactor A the acid slurry is caused to flow through the pipe 9 into the first neutralization reactor B, into which part of the phosphoric acid is simultaneously fed through the pipe 3 and part or all of the sulfuric acid along the pipe 12. The acid slurry and the added acids are neutralized to pH 2.5–4.5 with ammonia, which is fed into the reactor B through several nozzles 4. The reactor B is cooled to 110°–130° C.

From the reactor B the slurry is fed along the pipe 10 into the second neutralization reactor C, into which the rest of the phosphoric acid and sulfuric acid is fed along the pipes 3 and 12, and the slurry and the acids are neutralized to pH 5.0–6.0 by feeding ammonia through several nozzles 7 into the reactor. The temperature in this second neutralization reactor C is adjusted to the same range as in the first neutralization reactor B. Finally the slurry is removed from the reactor C along the overflow pipe 11. At this time the water content in the slurry is approx. 16–26%, usually 18%, and the slurry is directed to a system for further processing, e.g., granulation and drying.

The potassium salt and the trace elements are usually added to the second neutralization stage C along the pipe 14. The gases generated in the leaching reactor A are directed along the pipe 6 to the washer D and the washing water emerging from the washer D is directed along the pipe 6' to the first neutralization stage B, and the gases emerging from this neutralization reactor B are fed along the pipe 13 into the same cycle. The gases generated in the neutralization reactor C are directed along the pipe 5 to the washer E and the washing water from the washer E is returned to the reactor C along the pipe 5'.

At maximun 40%, but usually approx. 10%, of the total phosphoric acid and some sulfur acid are fed into the first neutralization reactor B to be mixed with the slurry arriving there as an overflow from the leaching reactor. The obtained mixture is neutralized with ammonia to pH 3.3–3.8, preferably 3.5. The ammonia is fed into the reactor through four pipes.

The ammonization reactors generate a great amount of heat and therefore the reactor temperature rises considerably The temperature is adjusted by means of cooling water which is fed to the mantle-cooling coil and by means of a sufficient feed of the gas-washing water. The aim is to maintain the reactor temperature at approx. 110° C. A raise in the temperature results in losses of ammonia and fluorine and causes a decrease in the soluble phosphorus amount; it also affects the corrosion resistance of the reactor.

The reactor is provided with a powerful mixer which maintains the slurry in swift motion. In general the slurry does not tend to thicken in this reactor but in the next one. It has been noted, however, that it is the operation condition the pH and phosphoric acid batching, in the first neutralization reactor that have an effect on the conditions in the second neutralization reactor. Especially the pH range is very important, and deviations must not be made from the pH range 3.3–3.8.

Potassium, dust, and trace elements can be fed into the first neutralization reactor if all of them cannot be fed into the second one.

In the second neutralization reactor C the rest of raw materials, such as the rest of the phosphoric acid (60–95%), possibly part of the sulfuric acid, depending on the formula, potassium, trace elements, dust, and gas-washing waters, are added, and the mixture is neutralized with ammonia. A great deal of heat is generated by the reaction, and the temperature is adjusted, as in the first neutralization reaction, by means of cooling water and gas-washing water. The temperature in the reactor is maintained at approx. 110° C, the pH within the range 5.5–5.8, and the water content at 16–26%. The reactor has been provided with a similar powerful mixer as the first neutralization reactor. The volume of the reactor is 25 m³ and the delay period 1 hour.

The invention is described in more detail with reference to the following Examples:

| Raw materials | | |
|---|---|---|
| apatite | 39% | $P_2O_5$ |
| nitric acid | 60–65% | $HNO_3$ |
| phosphoric acid | 40–50% | $P_2O_5$ |
| sulfuric acid | 93% | $H_2SO_4$ |
| ammonia | (gas) | |
| potassium salt | 60% | $K_2O$ |
| trace element | | fertilizer borate |

When manufacturing a 15-20-15 = $N:P_2O_5:K_2O$ fertilizer at the rate of 42 tons/hour, 118 kg of apatite was fed into the leaching reactor along the pipe 1. 253 kg of nitric acid was fed into the same reactor along the pipe 2. The temperature in the leaching reactor was 50° C.

The acid slurry was directed thereafter to the first ammonization reactor B, into which 10% of the phosphoric acid was fed along the pipe 3, and gaseous ammonia was fed along the pipe 4 through several nozzles to the bottom of the reactor so that the pH of the slurry rose to 3.5.

By extraneous cooling and by the evaporation of water the temperature in the reactor B was maintained at 125° C. The gas-washing waters from the washer D were also fed into it.

From the reactor B the slurry flowed into the second ammonization reactor C. The rest of the phosphoric acid was fed into it along the pipe 3. The total consumption of phosphoric acid was 160 kg. Sulfuric acid was not used. Ammonia was fed through several nozzles (pipe 7) to the bottom of the reactor so that the pH of the slurry in the reactor C rose to 5.5. Gas-washing waters from the washer E were fed into the reactor. The total ammonia consumption of the ammonization reactors B and C was 114 kg.

The reactor temperature was 125° C. 260° kg of a potassium salt was also fed into it along the pipe 8 and 2.2 kg of fertilizer borate.

The raw material quantities have been based on one ton.

The product was an NPK slurry which had a water content of 18% and was suitable for further processing by conventional granulation methods.

EXAMPLE 2

In the example the crude phosphate was morocco phosphate and frothing was checked by defrothers.

| Raw materials | | |
|---|---|---|
| morocco phosphate | 34% | $P_2O_5$ |
| nitric acid | 40–65% | $HNO_3$ |
| phosphoric acid | 40–50% | $P_2O_5$ |
| sulfuric acid | 93% | $H_2SO_4$ |
| ammonia | gas | |
| potassium salt | 60% | $K_2O$ |
| magnesium sulfate and fertilizer borate as trace elements | | |

The product was of the type $N : P_2O_5 : K_2O = 20:10:10$

Morocco phosphate was fed into the reactor 1, i.e., the leaching reactor, at the rate of 62 kg/h, nitric acid at 608 kg/h, and additional water at 0.6 kg/h.

The reactor temperature was 67° C, and thereafter the acid slurry was fed into the first neutralization reactor, into which ammonia and 10% of the phosphoric acid were fed, so that the pH of the slurry rose to 3.3. The temperature in the reactor was 110° C.

From the first neutralization reactor the slurry was directed to the second neutralization reactor, into which the rest of the ammonia and 90% of the phosphoric acid were fed. The pH of the slurry was thereby raised to 5.6. The temperature was maintained at 110° C by means of a control system (water jacket). The water content in the slurry was 18%.

Sulfuric acid at a rate of 78 kg/h, potassium salt at 167 kg/h, and the trace elements (magnesium sulfate at 43 kg/h and fertilizer borate at 2.2 kg/h) were also fed into the second neutralization reactor.

Gas-washing waters were fed into both neutralization reactors.

The product with a water content of 18% was fed into a granulator and a high-quality 10-10-10 granulated fertilizer was thereby obtained.

EXAMPLE 3

This is a reference example in which the conditions were not within the range delimited by the invention.

| Raw materials | | |
|---|---|---|
| apatite | 39% | $P_2O_5$ |
| nitric acid | 60–65% | $HNO_3$ |
| phosphoric acid | 40–50% | $P_2O_5$ |
| sulfuric acid | 93% | $H_2SO_4$ |
| ammonia | gas | |
| potassium salt | 60% | $K_2O$ |

Apatite at the rate of 12 kg/h and nitric acid at 45.8 kg/h were fed into the reactor 1, i.e., the leaching reactor. The reactor temperature was 66° C. The acid slurry from the reactor 1 was fed thereafter into the first neutralization reactor, into which 50% of the phosphoric acid and some ammonia were fed so that the pH of the slurry rose to approx. four. The reactor temperature was 104° C.

Thereafter the slurry was fed into the second neutralization reactor, into which the rest, i.e., 50%, of the phosphoric acid, sulfuric acid at 2.2 kg/h, potassium salt at 25.1 kg/h, and ammonia were added so that the pH rose to 5.6.

In this case water had to be added in large quantities into the neutralization reactors since the slurry tended to solidify drastically, especially in the second neutralization reactor. Although the water content was as high as 30%, the flow of the slurry was very poor or nil, and the process could not be applied to the manufacture of industrial fertilizers.

What is claimed is:

1. A process for producing a slurry suitable for the manufacture of a mixed fertilizer containing nitrogen plus phosphorus from a crude phosphate which comprises bleaching with nitric acid to produce an acid slurry and neutralizing the acid slurry with ammonia under simultaneous cooling, in two stages in a first and a second neutralization zone, adding phosphoric acid to said acid slurry to reduce the amount crude phosphate required to satisfy the phosphorus requirement of the mixed fertilizer in an amount that at maximum 40% of the phosphoric acid is fed to the first neutralization stage in which the acidity of the slurry is maintained at a pH from 2.5 to 4.5 and adding the remainder of the phosphoric acid at a pH of 5 to 6 in the second neutralization stage.

2. The process according to claim 1, in which substantially all the phosphoric acid is added to the second neutralization stage.

3. The process according to claim 1, in which during the first and second neutralization stages the temperature is adjusted to 110°–130° C.

4. The process according to claim 1, in which a phosphoric acid with a concentration of approx. 30–50 % by weight $P_2O_5$ is added to the neutralization stages.

5. The process according to claim 1, in which, in addition to phosphoric acid, sulfuric acid is added to the neutralization stages.

6. The process according to claim 1, further comprising adding a potassium salt to the second neutralization stage and the slurry additionally contains potassium ion.

7. The process according to claim 1 wherein said phosphoric acid is added to said acid slurry into said first and second neutralization zone simultaneously with the addition of ammonia.

8. The process according to claim 1 wherein said phosphoric acid is added to said acid slurry into said first and second neutralization zone subsequent to the addition of ammonia.

9. The process according to claim 1 wherein the water content of the slurry after the second neutralization is 16–26%.

10. The process according to claim 1 wherein 10% of the total phosphoric acid is added into said first neutralization zone and the mixture is neutralized with ammonia at pH 3.3–3.8.

* * * * *